United States Patent [19]
Rose

[11] 3,844,366
[45] Oct. 29, 1974

[54] STEERING ASSEMBLY FOR SNOWMOBILE
[75] Inventor: Edgar Rose, Glencoe, Ill.
[73] Assignee: Outboard Marine Corporation, Waukegan, Ill.
[22] Filed: Feb. 9, 1973
[21] Appl. No.: 331,011

[52] U.S. Cl.............................. 180/5 R, 403/157
[51] Int. Cl............................................ B62m 27/02
[58] Field of Search............. 280/95, 69; 180/5 R; 403/79, 141, 157, 256, 355, 359

[56] References Cited
UNITED STATES PATENTS

| | | | |
|---|---|---|---|
| 1,757,412 | 5/1930 | Collins | 403/256 |
| 3,530,950 | 9/1970 | Lamb | 180/5 R |
| 3,608,658 | 9/1971 | Woodfill | 180/5 R |
| 3,613,809 | 10/1971 | Chaumont | 403/157 |

Primary Examiner—Philip Goodman
Attorney, Agent, or Firm—Michael, Best & Friedrich

[57] ABSTRACT

Disclosed herein is a snowmobile including a frame, a pair of transversely-spaced, front runners rotatably mounted on the frame, a generally vertical turning shaft extending upwardly from each runner and rotatably mounted on the frame, and a steering assembly operably connected to the turning shafts for turning the runners and thereby controlling the direction of movement of the snowmobile. The steering assembly includes a pair of steering levers connected to respective turning shafts and a pair of steering rods pivotally connected between respective steering levers and a steering column. In order to minimize the twisting force applied thereto during turning, the steering levers are arranged with a pair of vertically spaced, generally parallel arms and an end section integrally connecting the arms at one end. The upper end portion of the respective turning shafts extends through axially aligned apertures provided in the steering lever arms adjacent to the end section and the respective steering rod is mounted between the arms at the opposite end.

7 Claims, 4 Drawing Figures

PATENTED OCT 29 1974
3,844,366
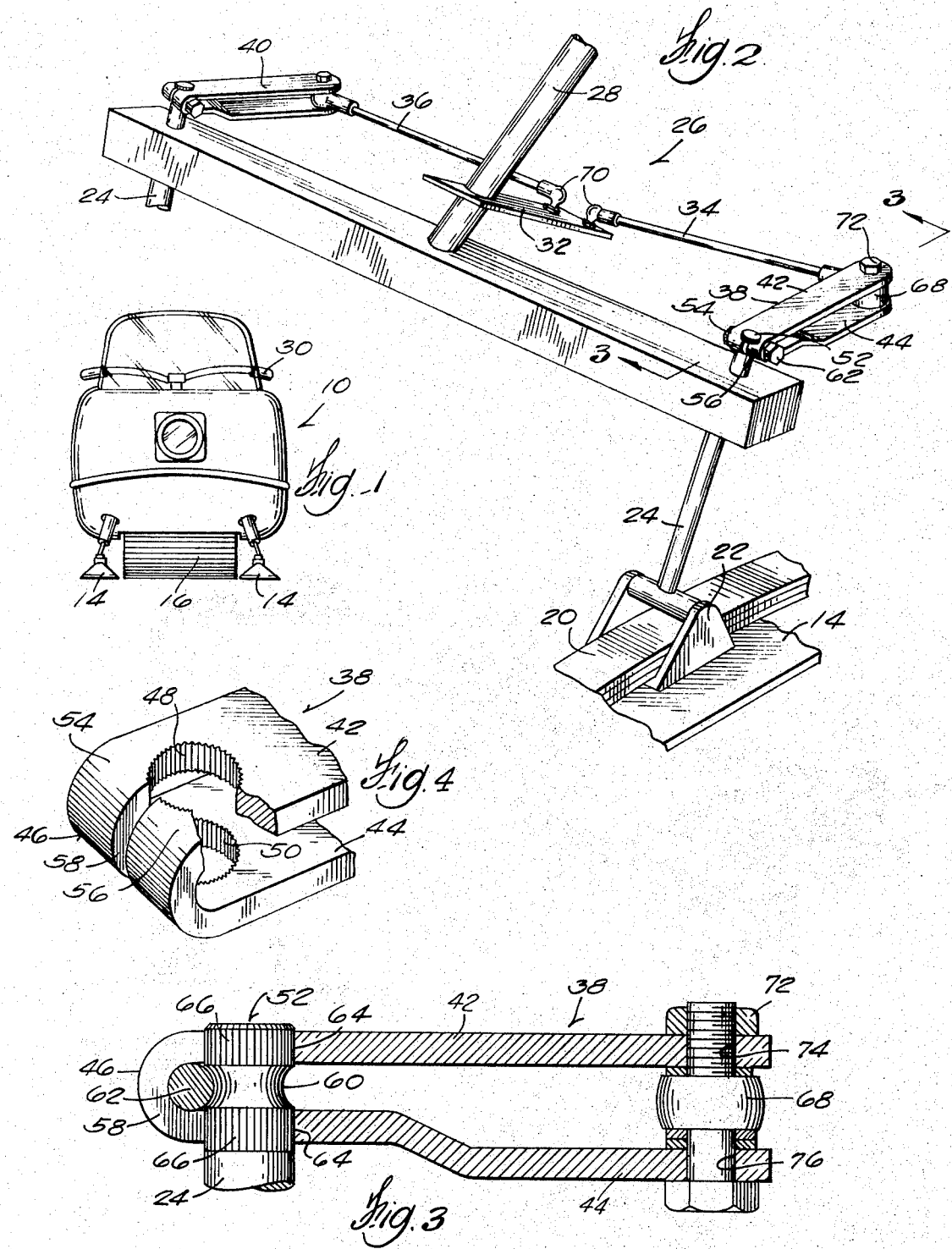

STEERING ASSEMBLY FOR SNOWMOBILE

BACKGROUND OF THE INVENTION

This invention relates to snowmobiles and, more particularly, to steering mechanisms for snowmobiles.

The directional movement of a snowmobile is controlled by a steering mechanism operably connected to a pair of transversely spaced front runners or skis. The steering mechanism includes a pair of steering levers connected to respective turning shafts or rods extending upwardly from the front runners and a steering column to which the steering levers are connected by steering or tie rods. The steering levers, in response to the actuation of the steering column, are moved by the respective steering rods and rotate the runners horizontally via the turning shafts to thereby negotiate a turn. The steering levers usually are in the form of a generally horizontally extending single arm with the steering rod being pivotally mounted to one of the sides of the single arm. Consequently, a substantial twisting force is applied to the steering lever by the steering rod during turning. This steering force can cause an eventual failure of the single arm with a resultant loss of steering control.

SUMMARY OF THE INVENTION

The invention provides a snowmobile with a steering assembly which includes steering levers having a double arm construction and mounted in a manner so as to minimize the twisting force imparted to the steering levers during turning of snowmobile.

More specifically, the steering levers include a pair of spaced arms, an end section integrally connecting the arms, and axially aligned apertures in the arms adjacent to the end section for receiving the upper end portion of shaft means which extends upwardly from a front runner and is rotatably mounted on the snowmobile frame. A pair of steering rods are mounted, at one end, between the arms of the respective steering levers and are operably connected at the other end to a steering column. Thus, the force applied to the steering lever by a steering rod during turning is divided between the arms, thereby substantially eliminating any relative twisting between the steering rod and the steering lever. The steering rods include a ball joint asembly which is mounted between the steering lever arms with a fastener means so that the ball joint assembly is trapped between the arms, thereby insuring maintenance of steering control in the event the ball joint fails.

A principal object of this invention is to provide a snowmobile including a steering assembly which is less susceptible to failures which can cause loss of steering control.

Another object of this invention is to provide a snowmobile including steering levers which are arranged to minimize the twisting force imparted thereto during turning of the snowmobile.

Other objects, aspects and advantages of the invention will become apparent from reviewing the following detailed description, the drawing, and the appended claims.

BRIEF DESCRIPTION OF THE DRAWINGS

FIG. 1 is a front view of a snowmobile embodying this invention.

FIG. 2 is an enlarged, fragmentary view of the steering assembly embodied in the snowmobile of FIG. 1.

FIG. 3 is a fragmentary, sectional view of a steering lever taken along the plane designated 3—3 in FIG. 2.

FIG. 4 is a fragmentary, perspective view of the left end portion of the steering lever shown in FIG. 3.

DESCRIPTION OF THE PREFERRED EMBODIMENTS

Before explaining the invention in detail, it is to be understood that the invention is not limited in its application to the details of construction and the arrangements of the components set forth in the following description or illustrated in the drawing. The invention is capable of other embodiments and of being practiced and carried out in the various ways. Also, it is to be understood that the phraseology and terminology employed herein is for the purpose of description and should not be regarded as limiting.

Shown in the drawing is a snowmobile 10 including a frame 12 and a pair of transversely-spaced, surface-engaging runners or skis 14 supporting the front end of the snowmobile 10. The snowmobile 10 is powered by an endless track 16 which is driven by an engine (not shown).

Leaf springs 20 (one shown fragmentarily in FIG. 2) are suitably connected to each of the runners 14 and spring saddles 22 (one shown) are connected to each of the leaf springs 20 at a point intermediate the ends thereof. Connected to and extending upwardly from the spring saddle 22 for turning the respective runners 14 are generally vertical shafts or rods 24 which are rotatably mounted on the frame 12.

To guide the directional movement of the snowmobile, there is provided a steering assembly 26 which includes a steering column 28 rotatably supported on the frame 12, a steering handle 30 connected to the upper portion of the steering column 28, a steering member 32 affixed to the lower portion of the steering column 28, left and right steering rods 34 and 36, respectively, and generally horizontally extending steering levers 38 and 40 which are mounted to the upper end portions of the respective turning shafts 24. One end of each of the steering rods 34 and 36 is pivotally connected to the steering member 32 with the other end being connected to the respective steering levers 38 and 40 so that the runners 14, in response to steering actuation of the steering column 28, are rotated horizontally via the respective shafts 24 to negotiate a turn.

In conventional snowmobiles, the steering levers are typically in the form of a single arm with the steering rods mounted to one of the sides of the single arm. Consequently, the steering rod imparts a substantial twisting force to the steering lever during turning. This twisting force eventually can cause failure of the steering lever and a resultant loss of steering control. In accordance with the invention, each of the steering levers is of double arm construction and the steering rods are mounted between the arms so to thereby substantially eliminate relative twisting of the steering rods and the steering levers.

The steering levers 38 and 40 and the steering rods 34 and 36 are constructed in the same manner. Accordingly, only the left steering lever 38 and the left steering rod 34 will be described in detail. The steering lever 38 includes a pair of vertically spaced, generally parallel arms 42 and 44 and a U-shaped end section 46 integrally connecting the arms 42 and 44. For connecting the steering lever 38 to the turning shaft 24, the arms 42 and 44 are provided with axially aligned, respective apertures 48 and 50 which are located adjacent the end section 46 and which receive the upper end portion 52 of the turning shaft 24.

Oppositely disposed clamping segments 54 and 56 for securing the steering lever 38 to the turning shaft 24 are formed in the end section 46 of the steering lever 38 by an elongated slot 58 extending longitudinally through the end section 46 from he apertures 48 and 50. Although various means can be provided for drawing the clamping segments 54 and 56 towards each other to secure the steering lever 38 to the turning shaft 24, in the construction illustrated, the upper end portion 52 of the turning shaft 24 includes a concave, circumferential recess 60 which, along with the interior of the end section 46 of the steering lever 38, defines a passageway for a clamping nut and bolt assembly 62. When tightened, the nut and bolt assembly 62 draws the clamping segment 54 and 56 towards each other and the walls of the apertures 48 and 50 are thereby moved into tight, clamping engagement with the upper end portion 52 of the turning shaft 24.

In order to insure fixed, non-slipping engagement between the steering lever 38 and the turning shaft 24, i.e., no relative rotational movement therebetween the apertures 48 and 50 are preferably provided with internal serrations 64 which mate with serrated sections 66 provided on the upper portion 52 of the turning shaft 24 as shown in FIG. 3.

In order to compensate for the differences in orientation of the planes of the steering member 32 and the steering lever 38, ball joint assemblies 68 and 70 are provided on the opposite ends of the steering rod 38 for respectively pivotally connecting the steering rod 34 to the steering member 32 and the steering lever 38. The ball joint assembly 68 mounted on the outer end of the steering rod 34 is received between the free end portion of the arms 42 and 44 and is secured in place by a nut and bolt assembly 72 which extends through axially aligned apertures 74 and 76 provided in the respective arms 42 and 44 and a central aperture (not shown) provided in the ball joint assembly 68. As best shown in FIG. 3, the free end portion of the lower arm 44 can be offset vertically to accommodate the ball joint assembly 68.

With this arrangement, the force applied to the steering lever 38 by the steering rod 34 during turning is divided between the arms 42 and 44 and is substantially parallel to the planes of both arms. Thus, twisting action on the steering lever 38 is minimized and the double arm arrangement provides a substantial increase in the strength of the steering lever against twisting. In prior art snowmobiles steering mechanisms, a single arm steering lever was connected to the steering rod via a ball joint assembly in a manner such that failure of the ball joint resulted in loss of the connection between the steering rod and steering lever and, thus, a loss of steering control. With the arrangement of the invention, the ball joint assembly mounting bolt is independently trapped in place by the double arm construction of the steering lever and, in the event of a ball joint failure, the steering rod remains connected to the steering lever to thereby insure maintaining some steering control.

Although the steering lever of the invention can be formed in various manners, in the construction illustrated, the steering lever 38 is made from an appropriately shaped, sheet metal blank which is reversely bent into the generally, U-shaped form shown.

Various features of the invention are set forth in the following claims:

What is claimed is:

1. A snowmobile comprising a frame, a pair of transversely-spaced runners for supporting said frame, means for rotatably mounting each of said runners on said frame and including a generally vertical shaft having an upper end portion, a steering assembly including a steering column, and means operably connecting said runners to said steering assembly for turning said runners in response to steering actuation of said steering assembly, said connecting means including a steering lever having a pair of spaced arms, an end section integrally connecting said arms, and axially aligned apertures in said arms and adjacent said end section for receiving said upper end portion of said shaft, and a steering rod having a first end operably connected to said steering column and a second end pivotally connected to said steering lever between said arms at a location remote from said apertures.

2. A snowmobile according to claim 1 wherein said steering lever arms include a slot extending longitudinally through said end section from said apertures so as to form said end section into oppositely disposed clamping segments and clamping means for drawing said clamping segments towards each other to thereby tightly secure said steering lever to said shaft.

3. A snowmobile according to claim 1 wherein said upper end portion of said shaft includes serrated sections and said steering arm apertures include serrations which mate with said shaft serrated sections to prevent relative rotational movement therebetween.

4. A snowmobile according to claim 2 wherein said clamping means includes a bolt and said shaft upper end portion includes a circumferential recess which, along with the interior of said end section, defines a passageway for receiving said bolt.

5. A snowmobile comprising a frame, a steering assembly including a steering column rotatably mounted on said frame, a pair of steering levers each including a pair of spaced arms, end sections integrally connecting said arms, axially aligned apertures in said arms adjacent to said end section, and a slot extending longitudinally through said end section from said apertures so as to form said end section into oppositely disposed clamping segments, a pair of transversely spaced runners for supporting said frame, means for rotatably mounting each of said runners on said frame including respective generally vertical shafts having upper end portions respectively extending in said aligned apertures of said steering levers, respective clamping means respectively connected to said steering levers for drawing said clamping segments toward each other to thereby tightly secure said shafts to said steering levers, and a pair of steering rods having respective first ends operatively connected to said steering column and respective second ends respectively pivotally connected to said arms of said steering levers at locations remote from said end sections.

6. A snowmobile according to claim 5 wherein said shaft upper end portion includes serrated sections and said steering arm apertures include serrations which mate with said shaft serrated sections to prevent relative rotational movement therebetween.

7. A snowmobile according to claim 5 wherein said clamping means includes a bolt and said shaft upper end portion includes a circumferential recess which, along with the interior of said steering lever end section, defines a passageway for receiving said bolt.

* * * * *